(12) United States Patent
Kurz et al.

(10) Patent No.: US 9,944,308 B2
(45) Date of Patent: Apr. 17, 2018

(54) STEERING COLUMN FOR A MOTOR VEHICLE

(71) Applicants: ThyssenKrupp Presta AG, Eschen (LI); ThyssenKrupp AG, Essen (DE)

(72) Inventors: Hannes Kurz, Feldkirch (AT); Markus Bialek, Buchs (CH); Werner Adelmann, Sennwald (CH); Matthias Nicolussi, Feldkirch (AT); Karl Mathias Hehle, Höbranz (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/328,107

(22) PCT Filed: Jun. 24, 2015

(86) PCT No.: PCT/EP2015/064191
§ 371 (c)(1),
(2) Date: Jan. 23, 2017

(87) PCT Pub. No.: WO2016/012180
PCT Pub. Date: Jan. 28, 2016

(65) Prior Publication Data
US 2017/0210410 A1    Jul. 27, 2017

(30) Foreign Application Priority Data

Jul. 21, 2014    (DE) .......................... 10 2014 110 204

(51) Int. Cl.
*B62D 1/184* (2006.01)
*B62D 1/187* (2006.01)

(52) U.S. Cl.
CPC ............ *B62D 1/184* (2013.01); *B62D 1/187* (2013.01)

(58) Field of Classification Search
CPC ................................. B62D 1/184; B62D 1/187
See application file for complete search history.

(56) References Cited

U.S. PATENT DOCUMENTS

| | | | |
|---|---|---|---|
| 6,305,712 B1 * | 10/2001 | Hayashi ................ | B62D 1/195 280/775 |
| 2005/0173912 A1 * | 8/2005 | Nakano ................ | B62D 1/184 280/777 |

(Continued)

FOREIGN PATENT DOCUMENTS

DE    102011000319 B3    5/2012

OTHER PUBLICATIONS

Int'l Search Report for PCT/EP2015/064191 (dated Sep. 22, 2015).

*Primary Examiner* — Darlene P Condra
(74) *Attorney, Agent, or Firm* — thyssenkrupp North America, Inc.

(57) ABSTRACT

A steering column for a motor vehicle may include a guide box that accommodates a steering spindle, a bracket for holding the guide box in adjustable fashion on a chassis of the motor vehicle, and a thrust piece through which a clamping shaft extends to fix the guide box relative to the bracket. The thrust piece may be arranged on an outer side of a first side web of the bracket, and the thrust piece may include a dome that extends through a slot of the first side web and serves to generate a force-fitting connection to the guide box.

13 Claims, 2 Drawing Sheets

(56) References Cited

U.S. PATENT DOCUMENTS

2008/0224459 A1* 9/2008 Oh .................. B62D 1/195
 280/777
2008/0238071 A1* 10/2008 Oh .................. B62D 1/195
 280/777
2008/0252056 A1 10/2008 Moriyama et al.

* cited by examiner

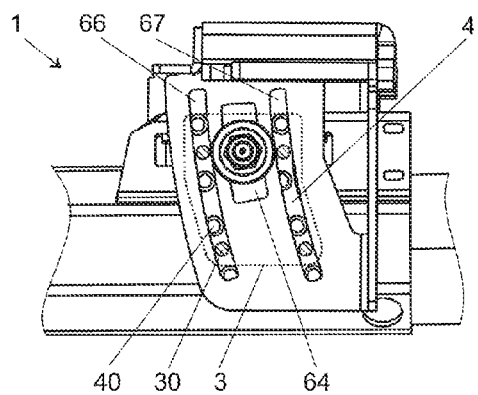
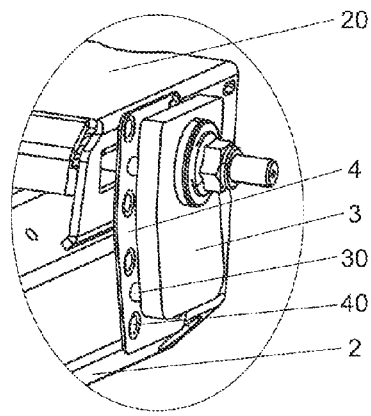
Figure 9    Figure 4
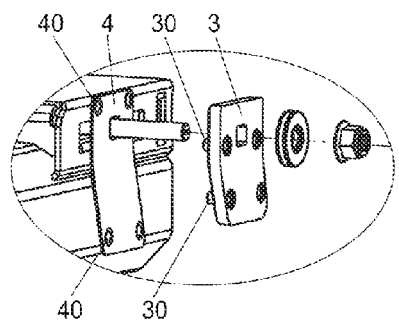
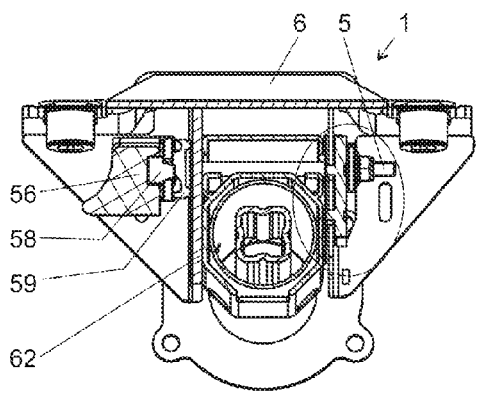
Figure 5    Figure 6
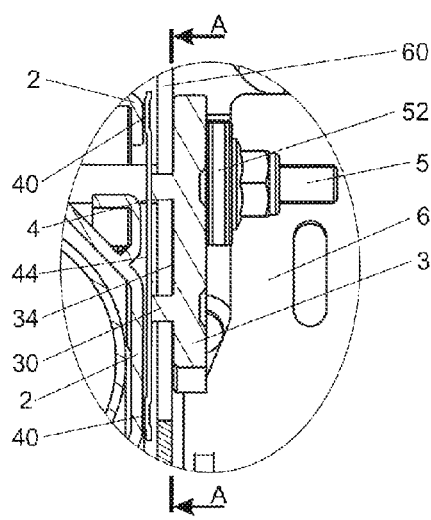
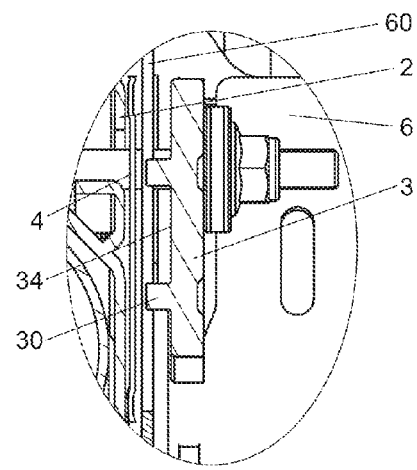
Figure 7    Figure 8

_US 9,944,308 B2_

STEERING COLUMN FOR A MOTOR VEHICLE

CROSS REFERENCE TO RELATED APPLICATIONS

This application is a U.S. National Stage Entry of International Patent Application Serial Number PCT/EP2015/064191, filed Jun. 24, 2015, which claims priority to German Patent Application No. DE 10 2014 110 204.5 filed Jul. 21, 2014, the entire contents of both of which are incorporated herein by reference.

FIELD

The present disclosure generally relates to adjustable steering columns for motor vehicles.

BACKGROUND

To adapt the position of the steering wheel in motor vehicles to the different ergonomic requirements of different users, steering columns are designed to be adjustable. In general, adjustable steering columns can be adjusted in a vertical direction and in a longitudinal direction of the motor vehicle. Here, a distinction can be made between a locked setting of the steering column, for the normal operation of the motor vehicle, and an unlocked setting, for the adjustment of the position of the steering column. In the locked setting, the steering column is fixed relative to the chassis of the motor vehicle. Here, the fixing of the steering column is selected such that the steering column withstands even the high loads that arise in the event of a crash, or permits a controlled dissipation of crash energy. At the same time, such fixings should, in the unlocked setting, permit easy manual adjustment of the steering column.

The adjustability of steering columns is generally made possible by way of variable positioning of a guide box, in which a steering spindle is received, relative to a bracket for the attachment to the chassis of the motor vehicle. In the case of the known solutions, a distinction is made here between force-fitting and form-fitting connections between guide box and bracket.

A form-fitting connection is known for example from DE 10 2011 000 319 B3. In the case of said form-fitting connections, there is the problem that the components involved in the form fit are also plastically deformed every time the steering column is locked. As a result, the components of the steering column that provide the contact are subject to considerable mechanical wear.

The locking systems based on a force-fitting connection permit locking of the steering column generally by way of the elastic deformation of the bracket. Locking based on a force fit is known for example from US 2008/0252056 A1. A disadvantage of said force-fitting connections is that, to provide the force fit, it is always necessary for one or more parts of the bracket to be of elastic form. This has the result that characteristics of the bracket, such as the rigidity thereof and the natural frequency thereof, are determined by the requirement for elasticity. Specifically with regard to the crash situation, however, high levels of rigidity of the bracket as an attachment point of the steering column to the chassis are desired. Furthermore, against the background of vibrations originating from the engine and from the roadway, high demands are placed on the natural frequency of the structural components of the steering column, and as high a natural frequency of the vibratory system as possible is desired.

BRIEF DESCRIPTION OF THE FIGURES

FIG. 4 is a schematic perspective detail view of an example thrust piece and of an example clamping plate on an example guide box.

FIG. 5 is a schematic exploded view of another example steering column.

FIG. 6 is a schematic sectional view through an example steering column.

FIG. 7 is a schematic sectional view through a detail of the steering column of FIG. 6 in a pre-locking setting.

FIG. 8 is a schematic sectional view of the steering column of FIG. 6 in an unlocked setting.

FIG. 9 is a schematic detail view of a side view of the steering column of FIG. 1.

DETAILED DESCRIPTION

Figure 1:
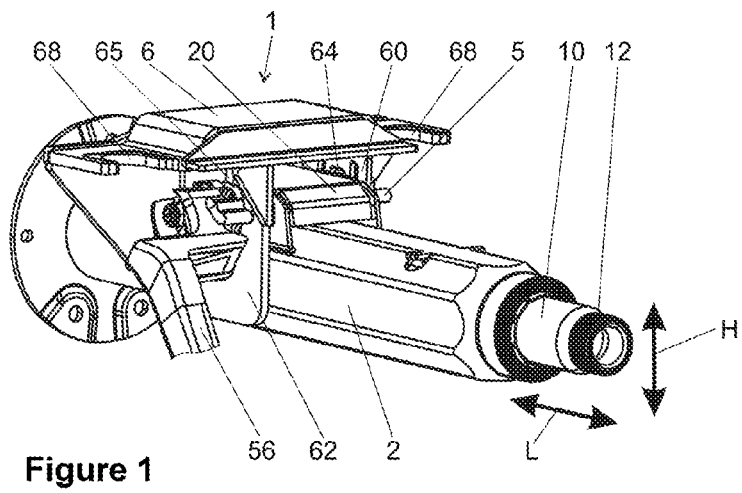
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide an improved steering column that comprises a high natural frequency and exhibits high rigidity. More generally, the present disclosure concerns steering columns for motor vehicles. In some examples, such steering columns may comprise a guide box for accommodating a steering spindle and a bracket for holding the guide box in adjustable fashion on a chassis of the motor vehicle. At least one thrust piece may be extended through by a clamping shaft and may serve for fixing the guide box relative to the bracket. The thrust piece may be arranged on an outer side of a side web of the bracket.

Correspondingly, a steering column for a motor vehicle is proposed, which steering column comprises a guide box for accommodating a steering spindle and comprises a bracket for holding the guide box in adjustable fashion on the chassis of the motor vehicle, comprising at least one thrust piece which is extended through by a clamping shaft and which serves for fixing the guide box relative to the bracket, which at least one thrust piece is arranged on an outer side of a first side web of the bracket. According to the invention, the thrust piece comprises at least one dome which extends through at least one slot of the first side web and which serves for generating a force-fitting connection to the guide box.

The pressing force, which is introduced into the thrust piece, for the fixing of the guide box relative to the bracket is transmitted by the at least one dome directly or indirectly to the guide box by virtue of said dome being pressed directly or indirectly against the guide box. As a result of the dome being pressed against the guide box in this way, a force-fitting connection is realized owing to the prevailing friction. The pressing force may alternatively also be referred to as clamping force.

By way of the dome of the thrust piece, clamping of the guide box can be generated without a deformation of the side webs of the bracket and without direct clamping of the guide box between the side webs of the bracket. Since, for the provision of the clamping, there is correspondingly no need for elastic deformability of the side webs of the bracket, said side webs can be designed to be rigid, such that a high natural frequency can be realized.

Here, the clamping of the steering column may be realized by virtue of the thrust piece, in a locked setting, in which the steering column is fixed relative to the chassis in a vertical direction and in a longitudinal direction, entering into a force-fitting connection with the outer side of the first side web of the bracket, and the dome of the thrust piece simultaneously entering into a force-fitting connection with the guide box. For this purpose, it is advantageous for the guide box to be of more elastic form than the bracket in order that, when the thrust piece lies against the outer side of the side web of the bracket, a clamping action between at least one dome and the guide box is made possible. Consequently, it is not necessary for the side web that interacts with the thrust piece to be pressed against the guide box.

By way of the at least one slot in the first side web of the bracket, through which slot the at least one dome of the thrust piece extends, said thrust piece can come into contact with the guide box regardless of a vertical clamping position relative to the first side web of the bracket. Here, the side web of the bracket comprises at least one further slot through which the clamping shaft is guided, which clamping shaft extends through the thrust piece or interacts with the thrust piece such that a force flow between clamping shaft and thrust piece is made possible. The slots run preferably parallel, or comprise the same radius central point. Furthermore, it is also conceivable and possible for the slots to be combined. In other words, the bracket comprises a single aperture through which the clamping shaft and at least one dome extends. It is thus correspondingly possible for a simple and stepless vertical adjustment of the guide box and thus of the steering wheel to be realized.

In the locked setting, the thrust piece lies against an outer side of the side web of the bracket, such that a secure connection between guide box and bracket is produced by way of the thrust piece.

The at least one dome is arranged so as to have a defined spacing to the clamping shaft, wherein the clamping shaft does not extend through the dome. In the case of an arrangement of at least two domes, said domes are arranged offset with respect to one another, preferably symmetrically with respect to a plane of symmetry running through the clamping shaft.

The thrust piece with all of the domes arranged thereon is preferably formed as a single integral component, for example as a sintered part, cast part or forged part.

In a preferred embodiment, between the side web of the bracket and the guide box, there is arranged a clamping plate for generating a force-fitting connection between the at least one dome of the thrust piece and the guide box. By way of the clamping plate, it is correspondingly possible for both the bracket and the guide box to be designed to exhibit a high natural frequency and high rigidity. Correspondingly, it is not necessary for the bracket and in particular the side webs thereof to be designed to exhibit a high level of elastic deformability. This is possible because the preload, required for the clamping force, between bracket and guide box can be provided by way of the clamping plate, which preferably exhibits a lower rigidity than the bracket and the guide box and which is particularly preferably highly elastic. The clamping plate may be manufactured for example from a spring steel.

By virtue of the fact that the dome, in the locked setting, acts directly on the clamping plate, it is possible for the guide box and the first side web of the bracket to be protected. Accordingly, in the event of repeated adjustment of the steering column, the punctiform introduction of force from the at least one dome into the clamping plate leads primarily to wear of the clamping plate, which can compensate the wear by way of a corresponding elastic form, such that reliable locking is possible over the service life of the steering column.

Furthermore, the play between the side web of the bracket and the guide box in an unlocked setting, in which the steering column is mounted so as to be adjustable relative to the chassis, is reduced by way of the clamping plate. In this way, undesired movements of the guide box about the longitudinal axis of the steering column in the unlocked setting can be restricted or prevented, such that the generation of noise is also reduced.

Furthermore, the play of the locking lever in the unlocked setting is reduced, which likewise has the effect that a noise reduction and improved haptics are realized.

Owing to the elastic characteristics of the clamping plate, said clamping plate can also function as a means for the setting-back of the thrust piece. Here, the fact that the clamping plate assumes an initial shape in the unlocked setting has the effect that the clamping plate exerts a pressure on the at least one dome of the thrust piece. In this way, the thrust piece is released from the outer surface of the first side web of the bracket, whereby the adjustability of the steering column is promoted when the clamping action is eliminated.

The force with which the thrust piece presses the clamping plate against the guide box in the locked setting, and the force with which the clamping plate releases the thrust piece from the side web of the bracket in the unlocked setting, are in this case dependent on the elastic characteristics of the clamping plate.

In a preferred refinement, the clamping plate is also extended through by the clamping shaft in order to permit guidance of the clamping plate by way of the clamping shaft. Since the clamping shaft runs or extends not only through the clamping plate but also through the thrust piece, it can be ensured that, regardless of the setting of the steering column relative to the side web, the clamping plate is always situated opposite the thrust piece. In an advantageous embodiment, a twist prevention means is provided between the clamping shaft and the clamping plate, for example by way of a form fit. In this way, the at least one dome of the thrust piece and the clamping plate can assume the same contact point in the locked setting. By virtue of the fact that the contact point between the at least one dome and the clamping plate is static, it is possible for the dome to be arranged on the thrust piece, and/or for the clamping plate to be dimensioned, so as to give consideration to the durability of the components and to the force flow between the components.

By virtue of the fact that the clamping plate and the thrust piece are always moved jointly by the clamping shaft relative to the guide box, it is not necessary for the clamping plate to cover all possible contact regions between the clamping plate and the guide box at once. Correspondingly, it is possible for the dimensioning of the clamping plate to be adapted to the dimensioning of the thrust piece and in particular to the number of domes provided on the thrust piece.

Furthermore, with regard to the clamping plate, the clamping shaft also performs a holding function.

In a preferred refinement, the clamping plate comprises contact sections, preferably elevations, particularly preferably embossments, very particularly preferably projections, which protrude from a base surface and which serve for generating contact with the guide box. By virtue of the fact that the clamping plate comprises protruding contact sections, elevations, embossments or projections, contact regions between the clamping plate and the guide box are defined. Since the clamping plate is guided by the clamping shaft and said clamping shaft can be adjusted relative to the guide box only along the longitudinal axis of the steering column, linear contact regions are realized between the protruding contact sections, elevations, embossments or projections of the clamping plate and the guide box.

Furthermore, the protruding contact sections, elevations, embossments or projections contribute to the clamping action in the locked setting of the steering column. Here, the regions of the clamping plate between the protruding contact sections, elevations, embossments or projections can be deflected to an extent smaller than or equal to the height of the protruding contact sections, elevations, embossments or projections in relation to the base surface of the clamping plate.

The at least one dome can, in the unlocked setting, be set back to the extent of the deflection performed by the clamping plate in the locked setting, such that the thrust piece moves away from the outer side of the first side web of the bracket at least to the extent of the deflection.

In a further preferred embodiment, a contact point of at least one dome is arranged in the region between in each case two of the protruding contact sections of the clamping plate. Since the region of the clamping plate between the protruding contact sections is spaced apart from the guide box by the height of the protruding contact sections, it is possible, by way of at least one dome, for elastic bending of said region of the clamping plate to be realized. The bending of the region between the protruding contact sections is in this case limited by the height of the protruding contact sections. The region between the protruding contact sections is preferably bent by the dome to an extent smaller than the height of the protruding contact sections. In this way, it is ensured that the force-fitting connection between the thrust piece and the outer side of the first side web of the bracket is provided, and is not impaired as a result of the base surface of the clamping plate being set down on the guide box.

As a result of the bending of the clamping plate in the region between the protruding contact sections, the protruding contact sections are pressed or clamped against the guide box.

In one refinement, a contact point of at least one dome has an equidistant spacing to at least two protruding contact sections of the clamping plate.

This yields, for the force flow originating from the dome, paths of equal length through the clamping plate into the guide box. This gives rise to a uniform force distribution in the clamping plate, such that the protruding contact sections are pressed or clamped uniformly against the guide box.

The fact that the protruding contact sections are pressed with a uniform clamping force against the guide box results in uniform wear of the contact regions on the guide box, which are described by the contact between the protruding contact sections of the clamping plate and the guide box. The uniform clamping force originating from at least two protruding contact sections also has the advantage that the guide box can, with regard to its strength and rigidity, in particular its wall thickness, be of homogeneous design, because the load or wear originating from the at least two protruding contact sections is always equal.

In a further preferred refinement, the thrust piece comprises a roughened inner surface for the purpose of generating an improved force-fitting connection to the bracket. The roughened inner surface of the thrust piece leads to increased static friction between the thrust piece and the outer side of the side web of the bracket in the locked setting. The force-fitting connection between the thrust piece and the side web of the bracket is thereby promoted. A roughened surface is to be understood as having mean roughness depths Rz of greater than 3.2 µm, preferably greater than or equal to 6.3 µm.

In a further refinement, the thrust piece comprises engagement elements on an inner surface for the purposes of generating a form-fitting connection to the bracket. By way of the engagement elements, which may for example be in the form of studs, a form-fitting connection between the thrust piece and the side web of the bracket can be realized by virtue of the engagement elements penetrating into the surface of the side web of the bracket. Here, the material at the surface of the side web of the bracket is displaced by the engagement elements. Thus, during every clamping process, the engagement elements cause renewed deformation of the surface of the side web of the bracket. Overall, in relation to a thrust piece which comprises no engagement elements, the force required to maintain the clamping action is lower.

In one refinement, in an unlocked setting, a gap is provided between the clamping plate and the bracket and/or between the clamping plate and the guide box. In this way, an adjustment of the steering column is made possible, wherein the guide box is adjusted relative to the bracket. In particular, a force-fitting connection between the clamping plate and the bracket and/or between the clamping plate and the guide box is prevented owing to the gap.

In a further preferred embodiment, the thrust piece comprises a guide by way of which said thrust piece is guided by the clamping shaft. It is thereby ensured that the thrust piece follows the movements of the guide pin during the adjustment of the steering column. The guide has the effect that the manner in which the thrust piece is positioned relative to the guide box is decisively defined. As a result, reproducible contact points between the at least one dome and the guide box, and between the at least one dome and the clamping plate, are realized.

In a preferred refinement, the clamping plate comprises a guide by way of which said clamping plate is guided by the clamping shaft. In this way, the clamping plate follows the clamping shaft and in particular the thrust piece. It can thus be ensured that the at least one dome of the thrust piece always comes into contact with the clamping plate.

Below, preferred exemplary embodiments will be described on the basis of the figures. Here, identical or similar elements or elements of identical action are denoted by identical reference designations. To avoid redundancies, a repeated description of said elements in the following description will, in part, be omitted.

Figure 2:
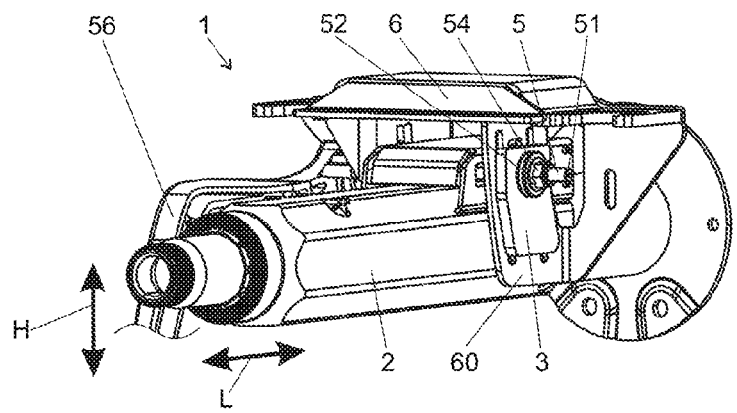
FIG. 2 is another schematic perspective view of the steering column of FIG. 1.

FIGS. 1 and 2 schematically show a perspective view of a steering column 1. The steering column 1 comprises a steering spindle 10 which, in a manner known per se, is mounted in rotatable fashion in a guide box 2. On one end of the steering spindle 10 there is arranged a steering-wheel connector piece 12 which serves for the connection of the steering spindle 10 to a steering wheel (not shown here).

The guide box 2 is connected adjustably to a bracket 6 which is connected, in a manner known per se, to the chassis of the motor vehicle. Here, the bracket 6 comprises fastening lugs 68 which serve for the attachment to the chassis of the motor vehicle.

The steering column 1 comprises a locking lever 56 which can be switched between an unlocked setting and a locked setting. In the unlocked setting of the locking lever 56, the guide box 2 together with the steering spindle 10 can be adjusted in a vertical direction H and in a longitudinal direction L relative to the bracket 6. The locking lever 56 acts, in a manner known per se, by way of a clamping shaft 5 between a first side web 60 and a second side web 62 of the bracket 6. Here, the guide box 2 comprises a clamping shaft guide 20 through which the clamping shaft 5 is guided. In the unlocked setting, the clamping shaft guide 20 permits a relative movement of the guide box 2 with respect to the clamping shaft 5 in the longitudinal direction L. Thus, the adjustability of the steering column 1 in the longitudinal direction L is defined by the adjustment travel provided for the clamping shaft 5 by the clamping shaft guide 20.

For the adjustment of the steering column 1 in the vertical direction H, the guide box 2 is pivoted together with the clamping shaft 5 relative to the first side web 60 and second side web 62 of the bracket 6. For this purpose, the first slot 64 and the second slot 65 are provided in the first side web 60 and in the second side web 62, by way of which slots the clamping shaft 5 is guided for the vertical adjustment of the steering column 1. Since the guide box 2 is generally arranged, for the adjustment in the vertical direction H, so as to be pivotable about a pivot axis, the first slot 64 and the second slot 65 comprise a curvature whose radius comprises its central point in the pivot axis.

In a locked setting of the locking lever 56, the guide box 2 is fixed relative to the bracket 6, such that movements in the longitudinal direction L and vertical direction H are prevented when the steering column 1 is in normal operation. Here, in the locked setting, the locking lever 56 imparts a clamping action which ensures the fixing of the individual components with respect to one another.

FIG. 2 shows an oblique view of the steering column 1 from FIG. 1. Here, a thrust piece 3 is arranged on an outer surface of the first side web 60 of the bracket 6, which thrust piece, in the locked setting of the steering column, is pressed against the outer surface of the first side web 60. The clamping force with which the thrust piece 3 is pressed against the first side web 60 originates in this case from a stroke movement of the clamping shaft 5 which is provided when the locking lever 56 is switched from the unlocked setting into the locked setting. Stroke movement is generated by way of a mechanism on that side of the clamping shaft 5 on which the locking lever 56 is also situated, for example by way of an eccentric. On the clamping shaft 5 there is seated an axial bearing 52 which is screwed, by way of a hexagonal nut 54, against the thrust piece 3. The hexagonal nut 54 is in this case screwed onto an external thread on the first end 51 of the clamping shaft 5.

Figure 3:
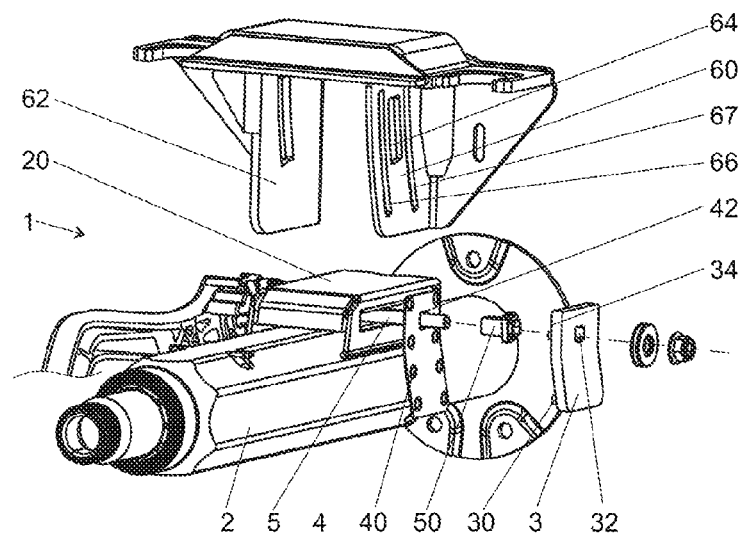
FIG. 3 is a schematic exploded view of the steering column of FIGS. 1 and 2.

FIG. 3 shows an exploded view of FIG. 2. It can be seen that the clamping shaft 5 protrudes out of the clamping shaft guide 20 of the guide box 2 and extends through a clamping plate 4 which, in the locked state of the steering column 1, is clamped against the guide box 2. For this purpose, four domes 30 which extend perpendicularly from the inner surface 34 of the thrust piece 3 make contact with the clamping plate 4, and said clamping plate is pressed against the guide box 2. A third slot 66 and a fourth slot 67 in the first side web 60 of the bracket make it possible for the four domes 30 of the thrust piece 3 to extend through the first side web 60 in order to make contact with the clamping plate 4 in the locked setting of the steering column 1. Here, in each case two domes 30 extend through the third slot 66 and the fourth slot 67.

The third slot 66 and the fourth slot 67 comprise a slight curvature, the radius of which comprises its central point in the pivot axis about which the guide box 2 can be pivoted. In an embodiment which is not illustrated, the first, second, third and fourth slots are oriented parallel to one another, wherein the pivot axis provides corresponding length compensation for the height adjustment, for example in the form of a further slot.

The clamping plate 4 comprises a guide 42 through which the clamping shaft 5 is guided. The thrust piece 3 also comprises a guide 32 through which the clamping shaft 5 can be guided. To ensure that the clamping plate 4 cannot be rotated relative to the thrust piece 3 and in particular the domes 30 thereof, a bearing bushing 50 with receptacles for the guide 42 and the guide 32 is provided. The bearing bushing 50 is correspondingly seated on the clamping shaft 5 and extends through the first slot 64 of the first side web 60, wherein the bearing bushing is guided in rotationally secured fashion in the slot 64. Here, the guide of the bearing bushing 50 for the clamping plate 4 comprises the negative form of the guide 42, wherein said negative form protrudes into the clamping shaft guide 20 and is in the form of an end stop in the longitudinal direction L. The guide of the bearing bushing 50 for the thrust piece 3 comprises the negative form of the guide 32. For securing in position along the longitudinal axis of the clamping shaft 5, the bearing bushing 50 comprises a collar which is situated in the slot 64 and which is simultaneously formed as an end stop in the vertical direction H.

It is ensured in this way that the four domes 30 of the thrust piece 3 make contact with the clamping plate 4 in a locked setting of the steering column 1, and in particular that it is always the same contact points on the clamping plate 4 that are contacted by the domes 30. Alternatively, it is also possible for the clamping plate 4 and the thrust piece 3 to be in the form of round bodies which are arranged so as to be rotatable about the clamping shaft 5. In this case, the clamping plate and the dome do not need to be fixed relative to one another by way of a bearing bushing, because the disk-shaped geometries of the clamping plate and of the thrust piece ensure that the domes of the thrust piece always come into contact with the clamping plate when the locked setting is assumed.

The clamping plate 4 shown in FIG. 3 comprises an approximately rectangular shape. Furthermore, the clamping plate 4 comprises eight elevations 40 which are distributed uniformly in the edge region and which protrude from a base surface of the clamping plate 4 in the direction of the guide box 2. The elevations 40 constitute the contact sections which are clamped against the guide box 2 when the steering column 1 is in the locked state.

In the detail view shown in FIG. 4, it is shown that the domes 30 make contact with the clamping plate 4 in a region between two elevations 40. Here, in FIG. 4, in order to better illustrate the interaction between the domes 30 of the thrust piece 3 and the clamping plate 4, the first side web 60 is not shown.

By virtue of the fact that the clamping plate 4 is guided by the clamping shaft 5, which in turn is guided in the clamping shaft guide 20 of the guide box 2, the generation of reproducible contact points between the elevations 40 of the clamping plate 4 and the guide box 2 can be ensured. In the embodiment shown in FIG. 4, there are thus four resulting linear contact points on the guide box 2, which run parallel to the clamping shaft guide 20. Here, each of the four linear contact points is contacted by in each case two elevations 40, arranged at one height, of the clamping plate 4. It is correspondingly sufficient for the guide box 2 to be configured so as to produce adequate, preferably uniform contact with the elevations 40 of the clamping plate 4 only in the region of the contact points.

It is also shown in FIG. 4 that a dome 30 is arranged so as to be equidistantly spaced apart from two adjacent elevations 40 of the clamping plate 4. In this way, in the locked setting of the steering column 1, a uniform force flow from the domes 30 via the clamping plate 4 to the guide box 2 is provided, such that the individual elevations 40 are clamped in each case with the same force against the guide box 2.

Suitable materials for the clamping plate 4 are steels with a high elastic limit, such as for example spring steel. Alternatively, the clamping plate 4 may also be formed from other metals or plastics.

The clamping plate 4 shown in FIG. 3 comprises eight elevations 40. Alternatively, the clamping plate 4 may also comprise some other number of elevations 40. FIG. 5 schematically shows, by way of example, an exploded view of a detail of the steering column 1, wherein not all components are shown. In particular, the bracket and the bearing bushing are not illustrated.

The clamping plate 4 shown in FIG. 5 comprises four elevations 40, which are arranged in the region of the corners of the clamping plate 4. Here, four domes 30 of the thrust piece 3 make contact with the clamping plate 4 in the locked setting of the steering column 1 such that, in the vertical direction between two elevations 40, in each case two domes 30 come into contact with the clamping plate 4.

Alternatively, the clamping plate 4 may also comprise one, two, three, five, six, seven, nine, ten or more elevations. The number of domes 30 may alternatively also be one, two, three, five, six, seven, eight, nine, ten or more. Furthermore, it is also possible for two, three, four or more clamping plates to be arranged between a side web of the bracket and the guide box, and for the lamellar effect of multiple friction surface pairs to thus be utilized.

Alternatively, a steering column may comprise two clamping plates, wherein the first clamping plate is arranged between the first side web of the bracket and the guide box and the second clamping plate is arranged between the second side web of the bracket and the guide box.

FIG. 6 shows a cross section perpendicular to the longitudinal axis of the steering column 1. Here, a first cam arrangement 58 and a second cam arrangement 59 are schematically shown, which serve for the generation of the clamping movement, that is to say the stroke movement of the clamping shaft, between the unlocked setting and the locked setting of the steering column 1. Here, either the first cam arrangement 58 or the second cam arrangement 59 is connected rotationally conjointly to the locking lever 56, and the respective other of the two cam arrangements 58, 59 is connected rotationally conjointly to the second side web 62 of the bracket 6. By rotation of the two cam arrangements 58 and 59 relative to one another about the longitudinal axis of the clamping shaft 5, the stroke movement between the unlocked setting and the locked setting of the steering column 1, and thus the clamping action, are generated.

FIG. 7 shows a detail view of the cross section from FIG. 6, wherein the steering column 1 is in the locked setting. Pressure is exerted by the clamping shaft 5 on the thrust piece 3 via the axial bearing 52, which pressure is just high enough that the domes 30 of the thrust piece 3 make contact with the clamping plate 4. Here, the elevations 40 of the clamping plate 4 lie against the guide box 2. The inner surface 34 of the thrust piece 3 is in contact with the first side web 60 of the bracket 6, such that a force-fitting connection is provided between the thrust piece 3 and the side web 60 by way of the clamping of the steering column.

The elevations 40 of the clamping plate 4 are ideally selected such that, in the locked setting of the steering column 1, the base surface 44, facing toward the guide box 2, of the clamping plate 4 does not quite make contact with the guide box 2. As a result, the contact between the clamping plate 4 and the guide box 2 is realized only by way of the elevations 40, whereby defined and reproducible contact points between the clamping plate 4 and the guide box 2 are realized.

Alternatively, the guide box 2 may be contacted both by the elevations 40 and by the base surface 44, facing toward the guide box 2, of the clamping plate 4.

The thrust piece 3 preferably comprises, for the generation of a force-fitting connection to the outer side of the first side web 60, a roughened inner surface 34 which comes into contact with the outer side of the side web 60. In an alternative, or in addition, the inner surface 34 of the thrust piece 3 may also be equipped with engagement elements which then engage into corresponding engagement elements on the outer side of the first side web 60 or which press into the material of the first side web 60 in order to provide a form-fitting connection.

FIG. 8 shows a detail view from FIG. 6, wherein the steering column is in the unlocked setting. Here, the domes 30 are not in contact with the clamping plate 4, nor is there contact between the inner surface 34 of the thrust piece 3 and the first side web 60. Between the guide box 2 and the side web 60 there is provided a gap which makes it possible for the clamping plate 4, in the unlocked setting of the steering column, to exhibit a degree of play sufficient for the adjustment of the guide box 2 relative to the side web 60. The gap between the guide box 2 and the first side web 60 is in this case selected such that, despite adjustability of the steering column, said gap prevents undesired tilting of the guide box 2 relative to the bracket 6.

Alternatively, the clamping plate may be slightly preloaded by the thrust piece in order to prevent undesired tilting of the guide box relative to the bracket.

FIG. 9 shows a detail of a side view of the steering column 1, wherein the thrust piece 3 is indicated merely by a dotted line. Here, a clamping plate 4 is shown with eight elevations 40. The four domes 30 of the thrust piece 3 are in this case arranged so as to make contact with the clamping plate 4 in the region between two elevations 40. FIG. 9 also shows the slight curvature of the first slot 64, of the third slot 66 and of the fourth slot 67, which results from the arrangement of the steering column 1 so as to be pivotable about a pivot axis (not illustrated).

Where applicable, all individual features presented in the individual exemplary embodiments may be combined with one another and/or exchanged for one another without departing from the scope of the invention.

LIST OF REFERENCE DESIGNATIONS

1 Steering column
10 Steering spindle
12 Steering-wheel connector
2 Guide box
20 Clamping shaft guide
3 Thrust piece
30 Dome
32 Guide
34 Inner surface
36 Outer surface
4 Clamping plate
40 Elevation
42 Guide
44 Base surface
5 Clamping shaft
50 Bearing bushing
51 First end
52 Axial bearing
54 Hexagonal nut
56 Locking lever
58 First cam arrangement
59 Second cam arrangement
6 Bracket
60 First side web
62 Second side web
64 First slot
65 Second slot
66 Third slot
67 Fourth slot
68 Fastening lug
H Vertical direction
L Longitudinal direction

What is claimed is:

1. A steering column for a motor vehicle comprising:
    a guide box that accommodates a steering spindle;
    a bracket for holding the guide box in adjustable fashion on a chassis of the motor vehicle; and
    a thrust piece through which a clamping shaft extends, serving to fix the guide box relative to the bracket, wherein the thrust piece is disposed on an outer side of a first side web of the bracket, wherein the thrust piece comprises a dome that extends through a slot of the first side web of the bracket and generates a force-fitting connection to the guide box.

2. The steering column of claim 1 further comprising a clamping plate disposed between the first side web of the bracket and the guide box, wherein the clamping plate generates the force-fitting connection between the dome and the guide box.

3. The steering column of claim 2 wherein the clamping plate is elastic and is elastically deformable by way of the dome.

4. The steering column of claim 2 wherein the clamping shaft extends through the clamping plate.

5. The steering column of claim 2 wherein the clamping plate comprises elevations that protrude from a base surface and generate contact with the guide box.

6. The steering column of claim 2 wherein the clamping plate comprises embossments that protrude from a base surface and generate contact with the guide box.

7. The steering column of claim 2 wherein the clamping plate comprises projections that protrude from a base surface and generate contact with the guide box.

8. The steering column of claim 2 wherein in an unlocked setting a gap exists between at least one of the clamping plate and the bracket or the clamping plate and the guide box.

9. The steering column of claim 2 wherein the clamping plate comprises contact sections that protrude from a base surface and generate contact with the guide box.

10. The steering column of claim 9 wherein a contact point of the dome is disposed in a region between the protruding contact sections of the clamping plate.

11. The steering column of claim 9 wherein a contact point of the dome is equidistant from at least two of the protruding contact sections of the clamping plate.

12. The steering column of claim 1 wherein the thrust piece comprises a roughened inner surface for generating a force-fitting connection to the outer side of the first side web.

13. The steering column of claim 1 wherein the thrust piece comprises engagement elements on an inner surface for generating a form-fitting connection to the outer side of the first side web.

* * * * *